United States Patent [19]

Alberino et al.

[11] Patent Number: 4,659,747

[45] Date of Patent: Apr. 21, 1987

[54] CYCLOHEXANEDIMETHANOL/DIAMINE MIXTURES AS RIM EXTENDERS

[75] Inventors: Louis M. Alberino, Cheshire; James R. Pritchard, Wallingford; Nancy P. Vespoli, Guilford, all of Conn.

[73] Assignee: The Dow Chemical Company, Midland, Mich.

[21] Appl. No.: 863,621

[22] Filed: May 15, 1986

[51] Int. Cl.$^4$ ............................................. C08G 18/14
[52] U.S. Cl. .................................... 521/159; 252/182; 521/163; 528/64; 528/76; 528/83; 528/85
[58] Field of Search .................. 521/159, 163; 528/64, 528/76, 83, 85; 252/182

[56] References Cited

U.S. PATENT DOCUMENTS

| | | | |
|---|---|---|---|
| 4,218,543 | 8/1980 | Weber | 521/51 |
| 4,269,945 | 5/1981 | Vanderhider et al. | 521/159 |
| 4,296,212 | 10/1981 | Ewen et al. | 521/163 |
| 4,374,210 | 2/1983 | Ewen et al. | 521/159 |
| 4,433,067 | 2/1984 | Rice et al. | 521/51 |
| 4,530,941 | 7/1985 | Turner et al. | 521/176 |

*Primary Examiner*—Maurice J. Welsh
*Attorney, Agent, or Firm*—J. S. Rose

[57] ABSTRACT

Polyurethane-polyurea polymers are disclosed that are derived from the reaction injection molding of organic polyisocyanates, optional high molecular weight active hydrogen containing compounds and extender mixtures comprising (i) aromatic diamines wherein at least one of the positions ortho to each amine group is substituted by a lower alkyl group and (ii) bis(hydroxyalkyl)cycloalkanes. The improved polymers have excellent resistance to high temperature conditions.

22 Claims, No Drawings

CYCLOHEXANEDIMETHANOL/DIAMINE MIXTURES AS RIM EXTENDERS

FIELD OF THE INVENTION

This invention relates to polyurethane-polyurea polymers and is more particularly concerned with reaction injection molded polyurethane-polyureas and novel miscible extender mixtures therefor.

DESCRIPTION OF THE PRIOR ART

Polyurethane-polyurea polymers are well known in the art. U.S. Pat. No. 4,218,543 was one of the earlier references providing a comprehensive review of the prior art relating to the RIM preparation of such polymers. Improvements in their production have been reported in U.S. Pat. Nos. 4,296,212 and 4,374,210 which disclose the use of extender blends of aromatic diamines with glycols and the use of isocyanate terminated prepolymers respectively. Additionally, the partial or total replacement of polymeric polyol components by amine terminated polyethers has been reported in U.S. Pat. Nos. 4,530,941 and 4,433,067.

Overall mechanical and thermal properties of the polyurethane-polyurea containing polymers are controlled by their concentrations of soft and hard segments. The terms "soft and hard segments" refer to the linkages derived from the polyisocyanate component with the high molecular weight organic polyols or amine terminated polyethers and with the low molecular weight extender molecules respectively. Primarily, the trend away from the use of glycol extenders (forming hard segment polyurethanes) to the use of aromatic diamines (forming hard segment polyureas) has been developed because of the enhanced properties of the latter polymer types.

Extender combinations of glycols with aromatic diamines provide beneficial results in polyurethane-polyurea RIM products; in this regard see particularly U.S. Pat. No. 4,296,212; also U.S. Pat. No. 4,433,067 discloses amine/glycol blends. U.S. Pat. No. 4,269,945 discloses the preparation of polyurethane-polyurea RIM products wherein the extender called for is a mixture of a glycol or aromatic polyamine with an aliphatic polyamine. U.S. Pat. No. 4,530,941 discloses polyurethane-polyurea RIM products wherein the extender as broadly disclosed can be a glycol, an aromatic polyamine, an aliphatic polyamine, or mixtures thereof.

The use of bis(hydroxyalkyl)cycloalkanes, e.g. bis(-hydroxymethyl)cyclohexane, as extenders in various polyurethane polymers has been disclosed in the art; see, for example, U.S. Pat. No. 4,376,834. However, to the best of our belief the specific use of bis(hydroxyalkyl)cycloalkanes along with particular alkyl hindered aromatic diamines as extender combinations in reaction injection molded polyurethane-polyurea polymers and the unexpected benefits to be derived therefrom have not been taught nor recognized in the prior art.

Hitherto, such hydroxyalkylcycloalkanes have not been desirable as extenders because of their tendency to be waxes or solids at temperatures well above room temperature (20° C.) and their lack of solubility in high molecular weight polyols. Surprisingly, it has been found that the aromatic diamines form miscible liquid blends with high percentage proportions of these diols. Furthermore, the aromatic diamines in solubilizing the diols allow for their admixture with high molecular weight polyols or polyamines forming very useful "B" side components for use in the RIM process.

Unexpectedly, it has been found that the present extender blends provide molded products characterized by better thermal properties than those products derived from the prior art type of glycol/diamine extender combination, including superior green strength at low molding temperatures.

SUMMARY OF THE INVENTION

This invention comprises improved polyurethane-polyurea polymers prepared by the catalyzed reaction injection molding of an organic polyisocyanate, an optional high molecular weight compound having at least two active hydrogen containing groups, and an extender mixture comprising (i) an aromatic diamine wherein at least one of the positions ortho to each amine group of said diamine is substituted by a lower alkyl group and (ii) a low molecular weight diol, wherein the improvement comprises employing as said diol a bis(hydroxyalkyl)cycloalkane.

This invention also comprises miscible blends comprising (i) the aromatic diamines and (ii) bis(hydroxyalkyl)cycloalkanes set forth above.

This invention also comprises miscible blends comprising the components (i) and (ii) set forth above and a high molecular weight compound having at least two active hydrogen containing groups.

The term "aromatic diamine" means an aromatic diamine obtained by replacing two nuclear hydrogen atoms of an aromatic hydrocarbon by —NH$_2$ groups said aromatic hydrocarbon having from 6 to 12 aromatic carbon atoms, inclusive, and is inclusive of phenylene, tolylene, naphthylene, and aromatic diamines having the formula

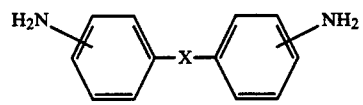

wherein X is selected from the group consisting of a single bond, —SO$_2$—, —CO—, —O—, and lower-alkylene from C$_1$ to C$_4$.

The term "lower-alkylene from C$_1$ to C$_4$" means alkylene having from 1 to 4 carbon atoms, inclusive, such as methylene, ethylene, propylene, butylene, and isomeric forms thereof.

The term "lower-alkyl" means alkyl having from 1 to 4 carbon atoms, inclusive, such as methyl, ethyl, propyl, butyl, and isomeric forms thereof.

The term "bis(hydroxyalkyl)cycloalkane" means a diol having the formula Y(ROH)$_2$ wherein Y represents a cycloalkylene having 5 to 7 ring carbon atoms, inclusive, such as cyclopentylene-1,2, cyclopentylene-1,3, 4-methylcyclo-pentylene-1,2, cyclohexylene-1,2, cyclohexylene-1,3, cyclohexylene-1,4, 2-methylcyclohexylene-1,4, 2,5-dimethylcyclohexylene-1,4, cycloheptylene-1,3, cycloheptylene-1,4, 5,6-dimethylcycloheptylene-1,4, and the like; and R represents a lower alkylene radical as defined above.

The term "high molecular weight compound having at least two active hydrogen containing groups" means a polymeric polyol or polymeric polyamine having a molecular weight of from about 1500 to about 12,000 and an active hydrogen functionality of from about 2 to about 6.

DETAILED DESCRIPTION OF THE INVENTION

The preparation of the polyurethane-polyurea polymers of the invention can be carried out using any of the conventional RIM techniques. For illustrative and detailed teaching in respect of RIM methods including reactants and molding procedures reference is made to the U.S. Pat. Nos. 4,218,543, 4,296,212, 4,374,210, and 4,433,067 cited supra, whose disclosures relative thereto are incorporated herein by reference. The novelty in the present polymers resides in the extender combination comprising the aromatic diamines (i) and bis(hydroxyalkyl)cycloalkanes (ii) defined above.

In respect of the aromatic diamine component (i) defined above, this embraces a well known class of aromatic diamines as typically disclosed in the above patents already incorporated herein by reference. Preferably, the aromatic diamine nucleus is selected from the mono-aromatic ring diamines and the di-aromatic ring diamines described above wherein X represents a methylene radical.

Illustrative, but not limiting, of the aromatic diamines used in accordance with the present invention are 1,3-dimethyl-2,4-diaminobenzene, 1,3-diethyl-2,4-diaminobenzene, 1,3-dimethyl-2,6-diaminobenzene, 1,4-diethyl-2,5-diaminobenzene, 1,4-diisopropyl-2,5-diaminobenzene, 1,4-dibutyl-2,5-diaminobenzene, 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene (and mixtures of the latter two diamines in varying proportions), and the like; 2,3-dimethyl-1,4-diaminonaphthalene, 2,6-dimethyl-1,5-diaminonaphthalene, 2,6-diisopropyl-1,5-diaminonaphthalene, 2,6-dibutyl-1,5-diaminonaphthalene, and the like; 3,3',5,5'-tetramethyl-benzidine, 3,3', 5,5'-tetraisopropyl-benzidine, and the like; 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3',5,5'-tetrabutyl-4,4'-diaminodiphenylmethane, 3,5-diethyl-3'-methyl-2',4-diaminodiphenylmethane, 3,5-diisopropyl-3'-methyl-2',4-diaminodiphenylmethane, 3,3'-diethyl-2,2'-diaminodiphenylmethane, and the like; 3,3',5,5'-tetraethyl-4,4'-diaminobenzophenone, 3,3',5,5'-tetraisopropyl-4,4'-diaminobenzophenone; 3,3',5,5'-tetraethyl-4,4'-diaminodiphenyl ether, 3,3',5,5'-tetraisopropyl-4,4'-diaminodiphenyl ether; 3,3',5,5'-tetraisopropyl-4,4'-diaminodiphenyl sulfone, and the like.

A preferred group of aromatic diamines is comprised of 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 3,3',5,5'-tetraisopropyl-4,4'-diaminodiphenylmethane, and 3,3',5,5'-tetraethyl-4,4'-diaminodiphenylmethane.

A most preferred group is comprised of (a) 1-methyl-3,5-diethyl-2,4-diaminobenzene and 1-methyl-3,5-diethyl-2,6-diaminobenzene and mixtures of these in varying proportions, particularly the mixture comprising about 80 percent by weight of the 2,4-diamino isomer with 20 percent of the 2,6-isomer, and the mixture comprising about 65 percent by weight of the 2,4-isomer with about 35 percent of the 2,6-isomer, and (b) 3,3',5,5'-tetraethyl-4,4'-diaminodiphenylmethane.

The bis(hydroxyalkyl)cycloalkanes (ii) defined above are a well-known class of compounds which are either available commercially or else readily prepared via known organic synthesis routes. For example, the appropriately substituted xylenes can be halogenated on the alkyl groups to form the bis(haloalkyl)benzenes followed by the hydrogenation of the benzene ring and the basic hydrolysis of the halogen groups to provide the appropriately substituted bis(hydroxyalkyl)cyclohexane. Alternatively, the appropriately alkylated cyclopentane or cycloheptane can be treated similarly without the need of the hydrogenation step to provide the bis(hydroxyalkyl)cyclopentanes or cycloheptanes.

Generally speaking, the bis(hydroxyalkyl)cycloalkanes are obtained as cis/trans isomer mixtures but this in no way detracts from their beneficial effects. In fact, as noted below, this may actually be an advantageous property.

A preferred class of (ii) comprises the bis(hydroxyalkyl)cyclohexanes, and, most preferably, the 1,4-bis(hydroxyalkyl)cyclohexanes.

Illustrative but not limiting of (ii) are 1,2-bis(hydroxymethyl)cyclopentane, 1,2-bis(2-hydroxyethyl)cyclopentane, 1,2-bis(3-hydroxypropyl)cyclopentane, 1,2-bis(4-hydroxybutyl)cyclopentane, 1,2-bis(hydroxymethyl)-4-methylcyclopentane, 1,3-bis(hydroxymethyl)cyclopentane, 1,3-bis(2-hydroxyethyl)cyclopentane, 1,3-bis-(3-hydroxypropyl)cyclopentane, 1,3-bis(4-hydroxybutyl)cyclopentane, 1,3-bis(hydroxymethyl)-4-methylcyclopentane, 1,2-bis(hydroxymethyl)cyclohexane, 1,2-bis(2-hydroxyethyl)cyclohexane 1,2-bis(3-hydroxypropyl)cyclohexane, 1,2-bis(4-hydroxybutyl)cyclohexane, 1,2-bis(hydroxymethyl)-4-methylcyclohexane, 1,2-bis(2-hydroxypropyl)cyclohexane, 1,3-bis(hydroxymethyl)cyclohexane, 1,3-bis(2-hydroxyethyl)cyclohexane, 1,3-bis(3-hydroxypropyl)cyclohexane, 1,3-bis(4-hydroxybutyl)cyclohexane, 1,4-bis(hydroxymethyl)cyclohexane, 1,4-bis(2-hydroxyethyl)cyclohexane, 1,4-bis(3-hydroxypropyl)cyclohexane, 1,4-bis(4-hydroxybutyl)cyclohexane, 1,4-bis(2-hydroxypropyl)cyclohexane, 1,4-bis(hydroxymethyl)-2-methylcyclohexane, 1,4-bis(hydroxymethyl)-2,5-dimethylcyclohexane, 1,3-bis(hydroxymethyl)cycloheptane, 1,3-bis(2-hydroxyethyl)cycloheptane, 1,3-bis(hydroxymethyl)-5-methylcycloheptane, 1,4-bis(hydroxymethyl)cycloheptane, and the like.

Preferred of the exemplified compounds (ii) above are those based on cyclohexane, and, most preferably, the 1,4-bis(hydroxyalkyl)cyclohexanes.

The extender combinations of (i) and (ii) form miscible blends which can be employed as part of the B side in the RIM preparation of the instant polyurethane-polyureas, and, which blends, form part of the present invention. As noted previously, the aromatic diamine acts to dissolve the otherwise oily, waxy, or crystalline solid bis(hydroxyalkyl)cycloalkanes to form the miscible blends.

In respect of the proportions in which (i) and (ii) can be blended, there are no particular limitations only that the respective proportions be such that the resulting combination forms a miscible blend. Advantageously, both from the stand point of blend miscibility and polymer properties of the resulting RIM products, the blends comprise from about 20 to about 95 percent by weight of (i) and complementally from 80 to 5 percent of (ii). Preferably, (i) is from about 45 to about 85 percent by weight and (ii) 55 to 15 percent. It will be readily understood by those skilled in the art that the majority of the hard segment contents of the present polyurethane-polyureas is derived from the extender combination of (i) and (ii). This is not to say that some hard segment content cannot arise from the isocyanate or A side component which may contain an isocyanate prepolymer component derived from a minor proportion of a low molecular weight glycol or diamine reacted with a polyisocyanate.

Optionally, high molecular weight compounds having plural active hydrogen containing groups as defined above are employed in the preparation of the present polymers. Polyurethane-polyureas in accordance with the present invention can be prepared in the absence of such high molecular weight components, that is to say, by the reaction of simple polyisocyanate components and the extender blends. However, the products so produced have literally 100 percent hard segment content and are very specialized types of polymers which are difficult to process and demold. Alternatively, if it is desired to produce the present polymers having a soft segment content using only the extender blend of (i) and (ii) then recourse to isocyanate prepolymers prepared from a simple polyisocyanate and high molecular weight active hydrogen compounds is desirable.

Preferably, the high molecular weight compounds are employed in order to achieve a desirable balance between hard and soft segment contents in the final polymers.

Any of the polyols and polyamines disclosed in the patents cited supra whose disclosures are incorporated herein and which meet the definition set forth above can be employed. It will be obvious to one skilled in the art that when polyols are employed the resulting molded polymers contain high percentages of polyurethane linkages along with the polyurea linkages arising from the diamine extender. In the event that the polyamines are the ingredients chosen then the polymer would contain high percentages of polyurea linkages derived both from the polymeric polyamine and the diamine extender. The present process also includes the use of mixtures of polyols and polyamines.

In respect of the polymeric polyol component, the functionality is, preferably, from about 2 to about 4 with the hydroxyl functionality predominantly primary and a molecular weight from about 1500 to about 7000. Most preferably, the polyols have a functionality of about 2 to about 3 and M.W. from about 2000 to about 6000.

A preferred group of polyols comprises the polypropyleneoxy-polyethyleneoxy capped diols and triols obtained by the alkoxylation of water, ammonia, ethylene glycol, propylene glycol, trimethylolpropane, glycerine, aniline, ethanolamine, and the like; polyester diols obtained from the reaction of dibasic carboxylic acids such as succinic, adipic, suberic, azelaic, phthalic, isophthalic, and the like with alkylene glycols, and oxyalkylene glycols to form the corresponding polyalkylene, and polyoxyalkylene ester diols or copolymers thereof; and the vinyl-resin reinforced propyleneoxy-ethyleneoxy capped diols and triols, particularly those polyethers reinforced with polyacrylonitrile.

In respect of the polymeric polyamine component, the functionality is, preferably, from about 2 to about 4, wherein greater than 50 percent of the active hydrogens are primary and/or secondary amines. Most preferably, the polyamines are the predominantly primary amine terminated polyethylenoxy-polypropyleneoxy polyethers having a functionality of about 2 to about 3 and molecular weight from about 2000 to about 6000. This class of compounds is typically disclosed in U.S. Pat. No. 4,433,067 already incorporated herein.

It will be evident to those skilled in the art that the present polymers and methods comprehend the use of prepolymer technology wherein the isocyanate reactive components, particularly the organic polyols, can be prereacted in minor amounts with excess isocyanate prior to the final polymer forming RIM step. This was discussed above in connection with the introduction of soft segments via the polyisocyanate component.

In accordance with the present invention, miscible blends comprising the high molecular weight isocyanate reactive compounds described above and the miscible extender combinations of (i) and (ii) are provided. The solvency of the otherwise insoluble bis(hydroxyalkyl)cycloalkanes in the aromatic diamine allows for the formation of a totally miscible B side component for use in the RIM procedure. The blends so prepared can be stored, transported, and otherwise employed without separating out.

The proportions in which the extender combination can be mixed with the polyol or polyamine is not critical and indeed is limited only to the extent to whatever hard and soft segment proportions are desired. Generally speaking, the proportions are such that the blends maintain miscibility. Advantageously, the proportions in parts by weight are from about 150 to about 350 of extender blend per 100 parts of polyol or polyamine, and, preferably, are from about 200 to about 300 per 100 parts. The miscible blends described above are in the most convenient form for processing as a B side component in the RIM procedure. However, if desired, the individual components comprising (i), (ii), and the polyol or polyamine need not be preblended in order to carry out the RIM processing in accordance with the present invention but can be brought together at the time of reaction.

Generally speaking, when the optional high molecular weight active hydrogen containing compounds discussed above are employed, they are present such that their equivalent proportions (expressed as proportions by equavalent weight) to the total equivalent proportions of extender mixture are within the range of about 1:4 to about 1:100, preferably, from about 1:10 to about 1:80.

The polyisocyanates which can be used in accordance with the present invention can be any of the organic di- or higher functionality polyisocyanates known to those skilled in the polyurethane art and include those polyisocyanates disclosed in the patents incorporated herein by reference. The preferred class of polyisocyanates are the aromatic polyisocyanates.

Illustrative, but not limiting thereof, are m- and p-phenylene diisocyanate, 2,4- and 2,6-toluene diisocyanate and mixtures of these two isomers, methylenebis(phenyl isocyanate) inclusive of 4,4'-methylenebis(phenyl isocyanate), 2,4'-methylenebis(phenyl isocyanate), and mixtures of these methylenebis(phenyl isocyanate) isomers, 3,3'-dimethyl-4,4'-diisocyanatodiphenyl methane; liquefied forms of methylenebis(phenyl isocyanate) particularly liquefied forms (including mixtures containing up to about 30 percent of the 2,4'-isomer) of 4,4'-methylenebis(phenyl isocyanate) such as the carbodiimide-containing 4,4'-methylenebis(phenyl isocyanates) having isocyanate equivalent weights of from about 130 to about 180 prepared for example by heating 4,4'-methylenebis(phenyl isocyanate) with a carbodiimide catalyst to convert a portion of said isocyanate to carbodiimide; and liquefied forms of 4,4'-methylenebis(phenyl isocyanate) which have been reacted with minor amounts (from about 0.04 to about 0.2 equivalent per equivalent of isocyanate) of low molecular weight glycols such as dipropylene glycol, tripropylene glycol, and mixtures thereof; isocyanate terminated prepolymers having an isocyanate content of about 9 to about 20 percent by weight prepared from methylenebis(phenyl isocyanate) and a polyol having a functionality from 2 to 3 selected from polyalkyleneoxy polyols of M.W. 1000 to 10,000, polytetramethylene glycols of M.W. 600 to 5000, and polyester polyols of M.W. 500 to 8000, said polyol and said methylenebis(phenyl isocyanate) being reacted in the proportions of about 0.01 equivalent to about 0.5 equivalent of said polyol per isocyanate equivalent in accordance with U.S. Pat. No. 4,374,210 whose disclosure is already incorporated herein; also falling within the preferred group of polyisocyanates are blends or mixtures of any of the above polyisocyanates and particularly mixtures of the liquefied methylenebis(phenyl isocyanates) with each other and with the isocyanate terminated prepolymers described above in any proportions desired.

The proportions of polyisocyanate to the total active hydrogen equivalents comprised of the optional polyol/polyamine and the extender combination of (i) and (ii) are such that the ratio of isocyanate equivalents to the total active hydrogen equivalents falls within a range of from about 0.85:1 to about 1.20:1, preferably from about 0.95:1 to about 1.10:1.

Any of the urethane catalysts disclosed in the art supra can be employed in the present process. Such catalysts include organic and inorganic acid salts of, and organometallic derivatives of bismuth, tin, lead, antimony, cobalt, and the like, as well as phosphines and tertiary organic amines. A preferred group of such catalysts include stannous octoate, stannous oleate, dibutyltin diacetate, dibutyltin dioctoate, dibutyltin dilaurate, dibutyltin maleate, dibutyltin mercaptopropionate, dibutyltin didodecylmercaptide, dibutyltin bis(isooctylthioglycolate), and the like; triethylamine, triethylenediamine, N,N,N',N'-tetramethylethylenediamine, N-methylmorpholine, N,N-dimethylcyclohexylamine, and the like, and mixtures of the above in any combination.

Generally speaking, the catalyst or mixture of catalysts will fall within a range of from about 0.001 percent by weight to about 5 percent by weight based on the total weight of all the ingredients.

Optionally, blowing agents may be employed wherein compact tough skinned surfaces are desired. Any of the blowing agents known in the art can be used such as fluorocarbon blowing agents. Also, inert gases (e.g. nitrogen, argon, and the like) may be introduced to provide whatever degree of blowing is desired from micro-cellular to macro-cellular in nature.

Other optional additives such as dispersing agents, cell stabilizers, surfactants, internal mold release agents, flame retardants, colorants, reinforcing agents, fiber glass, and the like can be added to the ingredients in accordance with the present invention.

The polymers produced in accordance with the present invention are possessed of the combination of excellent physical properties such as high tensile strength, hardness, heat resistance, high flex modulus, good impact strength, and the like.

The surprising feature of the present polymers is their retention of the excellent physical properties which characterize molded polyurea polymers but at slow gel times. This feature allows for the molding of larger parts without property losses. Additionally, the hard segment content can be increased to higher levels compared with the prior art which leads to increased heat resistant properties.

As noted previously, the bis(hydroxyalkyl)cycloalkanes are, for the most part, obtained as cis/trans isomer mixtures. This feature is believed to be responsible for their formation of amorphous hard segments. Contrastingly, the well known glycols such as ethylene glycol and the like tend to form crystalline hard segments. The bis(hydroxyalkyl)cycloalkanes tend to have much higher Tg values than prior art glycol hard segments; for example, the Tg of the amorphous hard segment derived from methylenebis(phenyl isocyanate) and 1,4-bis(hydroxymethyl)cyclohexane has been observed by differential scanning calorimetry to be about 135° C. Comparatively, the corresponding amorphous hard segment prior to crystallization from ethylene glycol was observed to be 110°-120° C. The latter value is of marginal significance when high temperature resistance of the polyurethane-polyurea is being considered, whereas the 135° C. value represents a substantial increase in polymer resistance to high temperature conditions.

Accordingly, the present polyurethane-polyureas are characterized by higher heat resistance than prior art polymers derived from extender blends as measured by the HDT test in accordance with ASTM Test Method D648 and heat sag value (both tests set forth in footnotes to Table I below). This leads to improved green strengths for the molded polymers.

Additionally, the bis(hydroxyalkyl)cycloalkanes, for the most part, have higher equivalent weights than prior art glycols which result in less imbalance in processing parameters in respect of the aromatic diamine component; part for part there is less hard segment generated by the cycloalkane than by ethylene glycol for example. The advantageous features of the miscible blends have already been discussed hereinbefore.

Accordingly, the present polymers are useful for the preparation of solid cast elastomers, solid and microcellular RIM elastomers, and elastoplastics, all within a Shore D hardness range of from about 30 to about 90. The molded products find particular utility as auto parts such as car bumpers, body elements, panels, doors, engine hoods, skirts, air scoops, and the like. The high heat resistance of the molded parts allows for them to be painted on-line in an automotive assembly application.

The following examples describe the manner and process of making and using the invention and set forth the best mode contemplated by the inventors of carrying out the invention but are not to be construed as limiting.

EXAMPLE 1

The following experiment describes the RIM preparation of a series of polyurethane-polyureas (runs 1 through 7) in accordance with this invention and a comparison polyurethane-polyurea (run 8). A pilot plant scale RIM machine was employed along with the ingredients in the proportions in parts by weight set forth in Table I.

One tank of the RIM machine was charged with the A component (at about 100° F.) while a second tank was charged with the B component (about 110° F.). Metering pumps from each tank were used to deliver the ingredients into the impingement mixing head of the RIM machine. After mixing, the reaction mixture was directed into a metal mold measuring 10 inches × 18 inches × ⅛ inch. The mold temperatures for the respective runs are set forth in Table I and all moldings except Run 5 were postcured at 325° F. for ½ hour with the excepted molding receiving no postcuring.

Run 1 with the highest proportion of DETDA was brittle and not subjected to any testing. It is known that moldings having high polyurea contents require higher mold temperatures than is the case for polyurethanes. The maximum mold temperature available in these experiments was 360° F. which was not sufficiently high enough at the urea level in Run 1 to overcome the brittleness problem. At higher mold temperatures it is expected that the brittleness would be overcome.

Runs 2 through 7 were characterized by improved green strength, and, in fact, Run 5 showed that no post curing was even necessary at the DETDA level involved. All of the moldings were high modulus and further characterized by excellent high temperature resistance as evidenced by their HDT and heat sag properties.

Comparatively, Run 8 which did not contain the 1,4-cyclohexanedimethanol but instead ethylene glycol as the extender component with DETDA, had much inferior heat resistance to Runs 2 through 7.

pared four polyurethane-polyurea moldings (runs 9 to 12) in accordance with the present invention.

A and B component temperatures were 105° and 115° F., respectively, with a constant mold temperature of 300° F. throughout. Post curing was also constant at 325° F./½ hr. except for run 11 which received none.

The higher hard segment contents of these runs over those of Example 1 is reflected in the generally higher flexural properties of the former over the latter. Heat resistance properties are good as measured by HDT data and heat sag values at 275° F.

TABLE II

| Runs | 9 | 10 | 11* | 12 |
|---|---|---|---|---|
| Ingredients (pts. by wt.) | | | | |
| Component A | | | | |
| Isocyante II | 557 | 587 | 587 | 616.1 |
| Component B | | | | |
| Polyol I | 100 | 100 | 100 | 100 |
| DETDA | 125 | 125 | 125 | 125 |
| 1,4-Cyclohexanedimethanol | 125 | 125 | 125 | 125 |
| UL-28 | 0.1 | 0.1 | 0.1 | 0.1 |
| NCO Index | 0.95 | 1.00 | 1.00 | 1.05 |
| Comments | good | good | good | good |
| Properties | green str. | green str. | green str. | green str. |
| Density, g/cc. | 1.178 | 1.178 | 1.183 | 1.181 |
| Hardness, Shore D | 84 | 83 | 83 | 84 |

TABLE I

| Runs | 1 | 2 | 3 | 4 | 5 | 6 | 7 | 8 |
|---|---|---|---|---|---|---|---|---|
| Ingredients (pts. by wt.) | | | | | | | | |
| Component A | | | | | | | | |
| Isocyanate I[1] | 542.6 | 562 | 588.3 | 588.3 | 588.3 | 558.6 | 614.4 | 237.6 |
| Isocyanate II[2] | — | — | — | — | — | — | — | 158.4 |
| Component B | | | | | | | | |
| Polyol I[3] | 100 | 100 | 100 | 100 | 100 | 100 | 100 | 100 |
| DETDA[4] | 212.5 | 175 | 125 | 125 | 125 | 125 | 125 | 47 |
| Ethylene glycol | — | — | — | — | — | — | — | 51 |
| 1,4-Cyclohexanedimethanol | 37.5 | 75 | 125 | 125 | 125 | 125 | 125 | — |
| UL-28[5] | 0.05 | 0.05 | 0.05 | 0.05 | 0.05 | 0.05 | 0.05 | 0.05 |
| NCO Index | 1.00 | 1.00 | 1.00 | 1.00 | 1.00 | 0.95 | 1.05 | 1.00 |
| Mold Temp. °F. | up to 360 | 325 | 200 | 250 | 250 | 300 | 300 | 300 |
| Comments | bri. molding | not bri. after post curing | not bri. after post curing | good green str. no curing | good green str. no curing | good green str. no curing | good green str. no curing | good green str. no curing |
| Properties | | | | | | | | |
| Density, g./cc. | — | 1.15 | 1.16 | 1.16 | 1.17 | 1.13 | 1.16 | 1.21 |
| Hardness, Shore D | — | 80 | 80 | 80 | 80 | 80 | 80 | 75 |
| Tensile str., psi | — | 8550 | 7850 | 7450 | 7250 | 7130 | 7430 | 5525 |
| % Elongation | — | 29 | 28 | 27 | 16 | 22 | 22 | 15 |
| Flex Modulus, psi | — | 202,200 | 210,900 | 194,500 | 191,700 | 162,200 | 191,700 | 217,800 |
| Flex Str., psi | — | 12,020 | 12,230 | 11,370 | 11,370 | 10,470 | 11,960 | 10,720 |
| HDT[6] @ 264 psi, °C. | — | 199 | 154 | 141 | 156 | 155 | 152 | 100 |
| Heat Sag[7] | | | | | | | | |
| 275° F./1 hr. | — | 0.01 | 0 | 0.07 | 0.09 | 0.005 | 0.02 | — |
| 325° F./½ hr. | — | 0.02 | 0.03 | 0.18 | 0.21 | 0.1 | 0.11 | 0.93 |
| Notched Izod[8] ft.-lbs./in. 68° F. | — | 2.56 | 4.85 | 3.89 | 2 | 3.31 | 3.29 | 7.6 |

Footnotes to Table I:
bri. = brittle
str. = strength
[1]Isocyanate I: A blend of the following in proportions of parts by wt. (1) about 53 parts by wt. of a liquefied form of 4,4'-methylenebis(phenyl isocyanate) in which a portion of the isocyanate groups have been converted to carbodiimide (I.E. = 143); and (2) an isocyanate terminated prepolymer prepared from the reaction of about 25 parts of a methylenebis(phenyl isocyanate) [comprising about 89% of the 4,4'-isomer and 11% of the 2,4'-isomer] and 22 parts of a 5000 M.W. polypropyleneoxy-polyethyleneoxy triol having about 18 to about 19 percent by wt. E.O. content and about 85% primary hydroxyl groups, with OH E.W. = about 1626; I.E. of the blend = about 180.
[2]Isocyanate II: A liquefied methylenebis(phenyl isocyanate) prepared from 4,4'-methylenebis(phenyl isocyanate) and a mixture of a minor amount of dipropylene glycol and tripropylene glycol (equal parts by weight) wherein the total hydroxyl equivalents was about 0.2 per MDI equivalent; I.E. = about 181.
[3]Polyol I: A 6000 M.W. polypropyleneoxy-polyethyleneoxy triol (E.W. = about 2032).
[4]DETDA: A mixture of 80/20 percent by wt. of 1-methyl-3,5-diethyl-2,4-diaminobenzene and 1-methyl-3,5-diethyl-2,6-diaminobenzene, respectively.
[5]UL-28: A tin catalyst which is a dibutlytin dialcoholate (supplied by Witco Chemical Corp.).
[6]HDT: Heat deflection temperature determined in accordance with ASTM Test Method D648.

EXAMPLE 2

Using the same apparatus and procedure described in Example 1 but with ingredients in the proportions of parts by weight set forth in Table II there were pre- TABLE II-continued

| Runs | 9 | 10 | 11* | 12 |
|---|---|---|---|---|
| Tensile str., psi | 9370 | 9670 | 7060 | 9710 |
| % Elongation | 20 | 18 | 7.3 | 19 |
| Flex. Modulus, psi | 276,900 | 299,000 | 304,200 | 283,600 |
| Flex. Strength, psi | 14,710 | 16,650 | 8,699 | 15,070 |
| HDT @ 264 psi °C. | 147 | 151 | 141 | 142 |
| Heat Sag | | | | |
| 275° F./1 hr. | 0.09 | 0.06 | 0.06 | 0.03 |
| 325° F./½ hr. | 3.01 | 1.47 | 2.55 | 0.73 |
| Notched Izod ft.-lbs./in. 68° F. | 3.43 | 2.09 | 0.48 | 2.36 |

*No post curing.

EXAMPLE 3

Using the same apparatus and procedure described in Example 1 but with the ingredients in the proportions of parts by weight set forth in Table III there were prepared two polyurethane-polyurea moldings (runs 13 and 14) in accordance with the present invention.

A and B component temperatures were 116° and 128° F., respectively, with a very low mold temperature of about 130° F. in both runs. Run 13 was post cured at 250° F. for one hour, whereas run 14 was not.

Total hard segment content was low in these runs (about 45 percent) which is reflected in the much lower modulus values compared with previous examples. The molding temperature of 130° F. for this formulation was too low as evidenced by the poorer green strengths upon demold compared with previous runs wherein mold temperatures were higher. Concomitantly, the heat resistance was lower at these lower hard segment contents when compared with previous examples set forth above at higher hard segment content.

TABLE III

| Runs | 13 | 14 |
|---|---|---|
| Ingredients (pts. by wt.) | | |
| Component A | | |
| Isocyanate III[1] | 129.6 | 1 |
| Component B | | |
| Polyol I | 100 | 100 |
| DETDA | 20 | 20 |

TABLE III-continued

| Runs | 13 | 14 |
|---|---|---|
| 1,4-Cyclohexane-dimethanol | 20 | 20 |
| UL-28 | 0.2 | 0.2 |
| NCO Index | 1.00 | 1.00 |
| Post Curing, 250° F./1 hr. | No | Yes |
| Comments | Molding is somewhat dead on demold[3]. | Molding is somewhat dead on demold[3]. |
| Properties | | |
| Density, g./cc. | 1.13 | 1.12 |
| Hardness, Shore D | 50 | 53 |
| Tensile str., psi | 2954 | 3819 |
| % Elongation | 271 | 278 |
| Flex. Modulus, psi | 19,940 | 35,462 |
| Flex. Strength, psi | 1687 | 1923 |
| Heat Sag 250° F./½ in.[2] | 2.88 | 1.46 |

Footnotes to Table III:
[1]Isocyanate III: A blend of the following in proportions by wt. of (1) about 12.43 parts of a liquefied form of 4,4'-methylenebis(phenyl isocyanate) in which a portion of the isocyanate groups have been converted to carbodiimide (I.E. = 143); and (2) an isocyanate terminated prepolymer prepared from the reaction of about 52.08 parts of 4,4'-methylenebis(phenyl isocyanate) with about 29.76 parts of a polyethyleneoxy-polypropyleneoxy triol of hydroxyl eq. wt. of about 1675 and 5.72 parts of tripropylene glycol; I.E. of blend = about 235.
[2]Heat Sag differs from test description in Footnote 7 of Table I by having a 4" unsupported overhang instead of the 6" overhang.
[3]The as-molded properties would be improved if a higher mold temperature was employed; the 130° F. mold temperature is not optimum for these formulations.

EXAMPLE 4

Using the same apparatus and procedure described in Example 1 but with the ingredients in the proportions of parts by weight set forth in Table IV there were prepared six polyurethane-polyurea moldings (runs 15 to 20) in accordance with the present invention.

A and B component temperatures were 105° and 115° F., respectively. Mold temperatures for each run along with the post curing conditions are set forth in Table IV. Only extenders were employed in the B side and the hard segment content is relatively high at about 75%.

It will be noted that in these particular formulations, molding properties right at demold indicated the need for a higher catalyst level (run 19) which does not require post curing (run 20) to provide non-brittle products immediately upon demold. Contrastingly, runs 15 to 18 had slightly brittle properties prior to being post-cured.

TABLE IV

| Runs | 15 | 16 | 17 | 18 | 19 | 20 |
|---|---|---|---|---|---|---|
| Ingredients (pts. by wt.) | | | | | | |
| Component A | | | | | | |
| Isocyanate IV[1] | 601 | 601 | 627.8 | 627.8 | 627.8 | 1 |
| Component B | | | | | | |
| DETDA | 125 | 125 | 125 | 75 | 75 | 75 |
| 1,4-Cyclohexane-dimethanol | 125 | 125 | 125 | 175 | 175 | 175 |
| UL-28 | 0.1 | 0.1 | 0.1 | 0.1 | 0.2 | 0.2 |
| NCO Index | 1.00 | 1.00 | 1.00 | 1.00 | 1.00 | 1.00 |
| Mold Temp. °F. | 300 | 360 | 360 | 275 | 250 | 250 |
| Post Curing (325° F./½ hr.) | Yes | Yes | No | Yes | Yes | No |
| Comments | slightly bri. | slightly bri. | slightly bri. | soft on demold slightly brittle on cooling | Not bri. | Not bri. |
| Properties | | | | | | |
| Density, g/cc | 1.14 | 1.20 | 1.12 | 1.13 | 1.12 | 1.11 |
| Hardness, Shore D | 78 | 79 | 78 | 78 | 75 | 74 |
| Flex. Modulus, psi | 238,300 | 291,000 | 250,700 | 285,489 | 250,661 | 248,400 |
| Flex. Strength, psi | 12,887 | 14,379 | 12,469 | 12,786 | 11,800 | 11,217 |

TABLE IV-continued

| Runs | 15 | 16 | 17 | 18 | 19 | 20 |
|---|---|---|---|---|---|---|
| Heat Sag | | | | | | |
| 275° F./1 hr. | 0.015 | 0.03 | 0.025 | 0.29 | 0.08 | 0.26 |
| 325° F./½ hr. | — | 0.00 | — | — | 1.12 | — |
| Notched Izod ft.-lbs./in. 68° F. | 1.97 | 2.60 | 2.44 | 2.44 | 3.06 | 2.94 |

Footnote to Table IV:

[1]Isocyanate IV: A blend of the following components in the proportions expressed as percent by wt.: (1) 40% of an isocyanate terminated prepolymer prepared from the following ingredients expressed in proportions by wt.: (a) 33 parts of 4,4'-methylenebis(phenyl isocyanate), and (b) 67 parts of a polyoxypropylene triol capped with 15 to 18% E.O. and E.W. = 1650; (2) 20% of 4,4'-methylenebis(phenyl isocyanate) and (3) 40% of a liquefied form of 4,4'-methylenebis(phenyl isocyanate) in which a portion of the isocyanate groups have been converted to carbodiimide (I.E. = 143); I.E. of the blend = about 190.

EXAMPLE 5

The following experiment describes the preparation of miscible extender blends of 1,4-cyclohexanedimethanol (CHDM) and DETDA mixtures (defined in Footnote 4 of Table I above) and further miscible blends of the extender mixture with an organic polyol, all in accordance with the present invention.

The two sets of blends were prepared using the same general procedure in both cases and the blends then observed for miscibility over a period of time. The first set of CHDM and DETDA were prepared by first melting the solid CHDM at a temperature of about 60° to 70° C. and blending the fused material by stirring with the DETDA in a quart cup in the proportions in parts by weight set forth in Table V. The blend was then transferred to a glass jar. Duplicate samples of the blends were prepared so that they could be stored and observed both at ambient room temperature (68° F.) and at 120° F. The results of these observations are set forth in Table V wherein (+) signifies complete miscibility and (−) signifies either some separation of solid or complete solidification. At CHDM levels as high as 90 percent, separation of solids began occurring after 24 hours at room temperature but complete miscibility was maintained throughout the test period at 120° F.

The second set of blends were prepared similarly to those described above except that four samples of 250 parts of warm CHDM/DETDA blends in the respective weight percent proportions set forth in Table VI were each blended further with 100 parts by weight of the Polyol I identified in Footnote 1 to Table I above and stored in glass jars. Only one set of blends was prepared because the samples were observed only at the ambient temperature (68° F.).

The presence of the polyol had the effect of lowering the CHDM solubility slightly.

TABLE V

| CHDM/DETDA | | 50/50 | 70/30 | 80/20 | 90/10 |
|---|---|---|---|---|---|
| 1 hr. | RT | (+) | (+) | (+) | (+) |
| | 120° F. | (+) | (+) | (+) | (+) |
| 5 hrs. | RT | (+) | (+) | (+) | (+) |
| | 120° F. | (+) | (+) | (+) | (+) |
| 24 hrs. | RT | (+) | (+) | (+) | (−) |
| | 120° F. | (+) | (+) | (+) | (+) |
| 3 days | RT | (+) | (+) | (+) | (−) |
| | 120° F. | (+) | (+) | (+) | (+) |
| 7 days | RT | (+) | (+) | (−) | (−) |
| | 120° F. | (+) | (+) | (+) | (+) |
| 4 wks. | RT | (+) | (+) | (−) | (−) |
| | 120° F. | (+) | (+) | (+) | (+) |

Key: (+) = miscible; (−) = separation

TABLE VI

| CHDM/DETDA | 10/90 | 45/55 | 55/45 | 70/30 |
|---|---|---|---|---|
| 1 hr. | (+) | (+) | (+) | (+) |
| 4 hrs. | (+) | (+) | (+) | (+) |
| 24 hrs. | (+) | (+) | (+) | (+) |
| 1 wk. | (+) | (+) | (+) | (−) |
| 4 wks. | (+) | (+) | (+) | (−) |

Key: (+) = miscible; (−) = separation

We claim:

1. In a polyurethane polyurea polymer prepared by the catalyzed reaction injection molding of an organic polyisocyanate, an optional high molecular weight compound having at least two active hydrogen containing groups, and an extender mixture comprising (i) an aromatic diamine wherein at least one of the positions ortho to each amine group of said diamine is substituted by a lower alkyl group and (ii) a low molecular weight diol, the improvement which comprises employing as said diol a bis (hydroxyalkyl)cycloalkane.

2. A polymer according to claim 1 wherein said extender mixture comprises (i) from about 20 to about 95 percent by weight of said diamine and complementally (ii) from 80 to 5 percent of said bis(hydroxyalkyl)cycloalkane.

3. A polymer according to claim 1 wherein said aromatic diamine is selected from the group consisting of 1-methyl-3,5-diethyl-2,4-diaminobenzene, 1-methyl-3,5-diethyl-2,6-diaminobenzene, and mixtures thereof.

4. A polymer according to claim 1 wherein said diol comprises a bis(hydroxyalkyl)cyclohexane.

5. A polymer according to claim 1 wherein the ratio of isocyanate equivalents to the total active hydrogen equivalents of said optional active hydrogen containing compound and said extender mixture is from about 0.85 to about 1.2.

6. A polymer according to claim 1 wherein said optional active hydrogen containing compound is present such that its equivalent proportions to the total active hydrogen equivalents of said extender mixture falls within the range of from about 1:4 to about 1:100.

7. A polymer according to claim 6 wherein said equivalent proportions fall within a range of from about 1:10 to about 1:80.

8. A polymer according to claim 1 wherein said optional active hydrogen containing compound comprises a polyol.

9. A polymer according to claim 8 wherein said polyol has a molecular weight of from about 1500 to about 7000 and a primary hydroxyl functionality of from about 2 to about 4.

10. A polymer according to claim 1 wherein said polyisocyanate comprises an aromatic polyisocyanate.

11. A polymer according to claim 10 wherein said polyisocyanate is selected from the group consisting of (a) an isocyanate terminated prepolymer prepared from methylenebis(phenyl isocyanate); (b) a liquefied form of 4,4'-methylenebis(phenyl isocyanate); and mixtures of (a) and (b).

12. A high flexural-modulus polyurethane polyurea polymer prepared by the reaction injection molding of
   A. a polyisocyanate selected from the group consisting of (a) an isocyanate terminated prepolymer prepared from methylenebis (phenyl isocyanate); (b) a liquefied form of 4,4'-methylenebis(phenyl isocyanate); and mixtures of (a) and (b);
   B. a polyol having a molecular weight of from about 1500 to about 7000 and a primary hydroxyl functionality of from about 2 to about 4;
   C. an extender mixture comprising
      (i) from about 20 to about 95 percent by weight of an aromatic diamine selected from the group consisting of 1-methyl-3,5-diethyl-2,4-diaminobenzene, 1-methyl-3,5-diethyl-2,6-diaminobenzene, and mixtures thereof; and
      (ii) from about 80 to about 5 percent of a bis(hydroxyalkyl)cyclohexane, and
   D. a urethane catalyst wherein the equivalent proportions of said polyol (B) to the total active hydrogen equivalents of said extender mixture (C) falls within the range of from about 1:10 to about 1:80 and the ratio of isocyanate equivalents to the total active hydrogen equivalents of (B) and (C) is from about 0.85 to about 1.2

13. A polyurethane-polyurea according to claim 12 wherein said extender (i) comprises a mixture of 1-methyl-3,5-diethyl-2,4-,and 2,6-diaminobenzene and said extender (ii) comprises bis(hydroxymethyl) cyclohexane.

14. A polyurethane-polyurea according to claim 13 wherein said (i) is from about 45 to about 85 percent by weight and said (ii) from about 55 to about 15 percent.

15. A polyurethane-polyurea according to claim 14 wherein said polyisocyanate comprises a liquefied form of 4,4'-methylenebis(phenyl isocyanate).

16. A polyurethane-polyurea according to claim 14 wherein said polyisocyanate comprises a mixture of an isocyanate terminated prepolymer prepared from methylenebis(phenyl isocyanate) and a liquefied form of 4,4'-methylenebis(phenyl isocyanate).

17. A miscible blend comprising (i) an aromatic diamine wherein at least one of the positions ortho to each amine group is substituted by a lower alkyl group and (ii) a bis(hydroxyalkyl) cycloalkane.

18. A blend according to claim 17 wherein (i) comprises an aromatic diamine selected from the group consisting of 1-methyl-3,5-diethyl-2,4-diaminobenzene, 1-methyl-3,5-diethyl-2,6,-diaminobenzene, and mixtures thereof.

19. A blend according to claim 17 wherein (ii) comprises a bis(hydroxyalkyl)cyclohexane.

20. A blend according to claim 17 comprising from about 20 to about 95 percent by weight of (i) and from about 80 to about 5 percent of (ii).

21. A blend according to claim 17 comprising (i) from about 45 to about 85 percent by weight of a mixture of 1-methyl-3,5-diethyl-2,4-diaminobenzene and 1-methyl-3,5-diethyl-2,6-diaminobenzene and (ii) from about 55 to about 15 percent of bis(hydroxymethyl) cyclohexane.

22. A miscible blend comprising a blend according to claim 17 and a high molecular weight compound having at least two active hydrogen containing groups.

* * * * *

UNITED STATES PATENT AND TRADEMARK OFFICE
CERTIFICATE OF CORRECTION

PATENT NO. : 4,659,747

DATED : April 21, 1987

Page 1 of 2

INVENTOR(S) : Louis M. Alberino, James R. Pritchard and Nancy P. Vespoli

It is certified that error appears in the above-identified patent and that said Letters Patent is hereby corrected as shown below:

Columns 9 and 10, TABLE I, lines 62 through 64 the following footnotes to Table I were deleted in printing the patent and should be included:

[7] Heat Sag: Heat sag is determined by measuring the amount, in inches, that a 1 inch wide sample (about 1/8 inch thick) with a 6" unsupported overhang droops under its own weight when held at one end in a horizontal position under the specified conditions of time and temperature.

[8] Notched Izod: Impact test in accordance with ASTM Test Method D256.

Column 10, TABLE II, line 18 "Isocyante II" should read -- Isocyanate II --. Column 11, TABLE III, line 42 "Isocyanate III129.6" should read -- Isocyanate III$^1$ --; on same line under Run 14 of Isocyanate III delete "1" and insert -- 129.6 --. Column 12, TABLE IV, line 52

UNITED STATES PATENT AND TRADEMARK OFFICE
CERTIFICATE OF CORRECTION

PATENT NO. : 4,659,747

DATED : April 21, 1987

INVENTOR(S) : Louis M. Alberino, James R. Pritchard and Nancy P. Vespoli

It is certified that error appears in the above-identified patent and that said Letters Patent is hereby corrected as shown below:

"Isocyanate IV$^{601}$" should read -- Isocyanate IV$^1$ --; on same line under Run 17 of Isocyanate IV "627.8" should read -- 601 --; on same line under Run 20 of Isocyanate IV "1" should read -- 627.8 --.

Signed and Sealed this

Twenty-fourth Day of May, 1988

Attest:

DONALD J. QUIGG

Attesting Officer

Commissioner of Patents and Trademarks